Dec. 30, 1958  B. CORNELISON  2,866,400
APPARATUS FOR MAKING BEVERAGES
Filed July 20, 1954  2 Sheets-Sheet 1

INVENTOR
Boyd Cornelison

ATTORNEYS

Dec. 30, 1958  B. CORNELISON  2,866,400
APPARATUS FOR MAKING BEVERAGES
Filed July 20, 1954  2 Sheets-Sheet 2

INVENTOR
Boyd Cornelison

BY *Stevens, Davis, Miller and Mosher*
ATTORNEYS

United States Patent Office 2,866,400
Patented Dec. 30, 1958

2,866,400

APPARATUS FOR MAKING BEVERAGES

Boyd Cornelison, Dallas, Tex., assignor to Texas Instruments Incorporated, Dallas, Tex., a corporation of Delaware Application July 20, 1954, Serial No. 444,517

5 Claims. (Cl. 99—308)

This invention relates to an infusion apparatus for making beverages and more particularly, to an apparatus for making beverages requiring infusion in water at or slightly above the boiling point during the brewing process.

For a method and apparatus for brewing beverages from grindings or leaves to be appealing to the average person, a beverage of high strength per unit quantity of grindings or leaves in proportion to the unit quantity of water must be capable of being produced. As a second factor, the brewing step for a particular beverage must be conducted at a temperature which will extract the flavor from the grindings or leaves but not the bitterness. Further, in those instances where the beverage is not to be served immediately, it is desirable for the apparatus to maintain the beverage below the brewing temperature but at a sufficient temperature to avoid reheating before serving.

Of all of the methods and apparatus in use today for brewing beverages, perhaps the most refined method and the one which meets most of the above requirements is the forced-feed vacuum-return process. The apparatus of the vacuum-return process uses a lower bowl to contain the water and an upper bowl to contain the grindings or leaves. Hereinafter, the word "grindings" will be used alone to indicate the flavor source for the beverage, but the use of leaves or any similar substance as the flavor source for beverages is intended as within the meaning of the term. As a part of the upper bowl, a hollow tube is attached and sealed to the underside of the bowl in alignment with a centrally located opening in the lower bowl and is of a length that it extends almost to the bottom of the lower bowl when the upper bowl is in position on the lower bowl. A circumferential seal is normally provided at the junction between the upper and lower bowls and a filter arrangement covers the centrally located opening in the upper bowl. As the water in the lower bowl is heated to the boiling point, steam collects in the area above the water level and is prevented from escaping by the seal between the upper and lower bowls. When sufficient steam pressure builds up, the water is forced upward through the hollow tube and into the upper container where the hot water comes in contact with the grindings. After the source of heat is removed, the steam in the lower container condenses creating a vacuum which pulls the beverage in the upper container through the filter and back into the lower container, thus providing a brewed beverage separated from the grindings.

It is recognized in the art of making beverages that brewing at elevated temperatures, brewing for long periods of time, or reheating the beverage above its boiling point after it has been brewed brings out the bitterness in the grindings. In the forced-feed vacuum-return process, the beverage is not brewed at elevated temperatures or for such a length of time as to bring out the bitterness of the grindings. However, since the flavor is extracted solely by the hot water surrounding the grindings, the method does not extract the full flavor of the grindings and consequently, a larger amount of grindings is required than is necessary to produce a beverage of the desired strength. Further, if the beverage is not served within a reasonable time, it must be reheated to a satisfactory temperature and care must be exercised to prevent boiling or else the high temperature will bring out the bitterness of the brew.

This last objection has been overcome in part by an electric vacuum-return beverage maker which uses two different heat level heating elements, the upper level heating element being used to brew the beverage and the lower level heating element to keep the beverage at the proper serving temperature after brewing. The electric type of vacuum-return beverage maker, however, still extracts the flavor solely by surrounding the grindings with hot water as in the conventional vacuum-return process and, because it is considerably more expensive, the feature of keeping the beverage at serving temperature has been provided only a premium in initial cost.

The beverage maker of the present invention is very similar in operation to the vacuum-return apparatus throughout the first stages of the brewing process. However, at the point in the vacuum-return process where the steam pressure forces the water into the upper container, the present invention departs radically from the conventional methods to overcome the objections to and disadvantages of the prior art devices.

Accordingly, it is a principal object of this invention to extract the full flavor of the grindings by a novel means for circulating water through the grindings at the most desirable brewing temperature, such means using a combination of centrifugal force and gravity drip to circulate and recirculate the water.

It is another principal object of this invention to provide a method and apparatus for brewing the beverage which supplies its own motivating force for recirculating the water for a time only as long as is required to brew the desired quantity of the beverage.

It is a further object of this invention to provide an apparatus which maintains the brew at a desirable serving temperature below the temperature of boiling water for a reasonable time after brewing operation has been completed.

It is still another object of this invention to insure the quality of the beverage brewed by keeping the beverage separate and free from the grindings regardless of whether or not the source of heat is removed.

Other and further objects of this invention will appear from the following description when taken in conjunction with the drawings in which.

Figure 1:
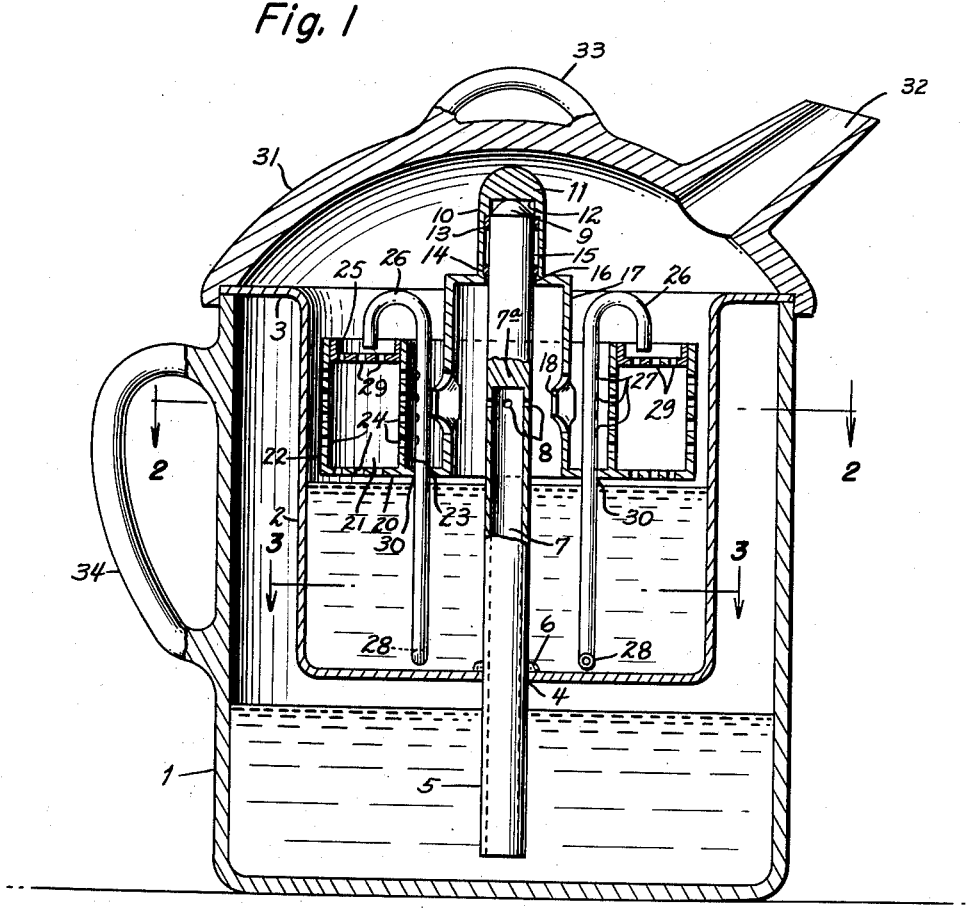
Figure 1 is an elevation view in cross-section showing the principal components of the apparatus of the invention taken along line 1—1 of Figure 2.

Referring now to the drawings in detail, the beverage maker of the present invention is shown consisting of an outer or lower container 1 made in the form of a cylinder open at one end and closed at the other end. The cylinder is constructed from any suitable material such as aluminum, stainless steel, or some heat resistant glass commonly known as "Pyrex." The diameter and height of container 1 is determined in part by the designed brewing capacity of the device and also by various constructional features necessary to carry out the objects of the invention. An inner or upper container 2 is constructed somewhat similarly to container 1 except that it is smaller in diameter and has a flange 3 extending around the open end of the cylinder and a centrally located opening 4 in the closed end of the cylinder. The outside diameter of flange 3 is equal to the outside diameter of container 1 and thus when container 2 is in position within container 1, flange 3 supports container 2 from the upper rim of container 1. A tube 5 extends through the centrally located opening 4 and is of such a length that when container 2 is in position in container 1, the lower end of the tube 5 is supported a short distance above the closed end of container 1 while the upper end of tube 5 extends above the open end of container 2. To seal container 2 against leakage, a continuous bead 6 of suitable sealing material is placed around the opening 4 to connect tube 5 integrally with the closed end of container 2. Tube 5 is hollow from its lower end to a point slightly above jet openings 8 drilled around the circumference of the tube and solid above that point to the upper end of the tube. The hollow portion is designated by the numeral 7 and the solid portion by the numeral 7a. The upper end of tube 5 is turned down to a cone shape except for the tip which is rounded off as at 9.

A rotating structure, composed of a series of cylinders suitably supported and connected together, is mounted on the upper part of tube 5 and on rounded point 9 specifically which in the circumstances of the invention serves as the bearing point for the rotating structure. Describing now the rotating structure, a cylinder 10 is closed by an end cap portion 11 provided with a flat inner surface 12 which rests on the rounded point 9 of tube 5. The inside diameter of cylinder 10 is slightly greater than the outside diameter of tube 5 and is turned down throughout a mid-section 15 to provide support shoulders for an upper bearing ring 13 and a lower bearing ring 14. Bearings 13 and 14 are composed of any suitable low friction material, such as Teflon, and bear in spaced relation against the upper end of tube 5 to provide a fixed alignment for the structure when rotating.

Figure 2:
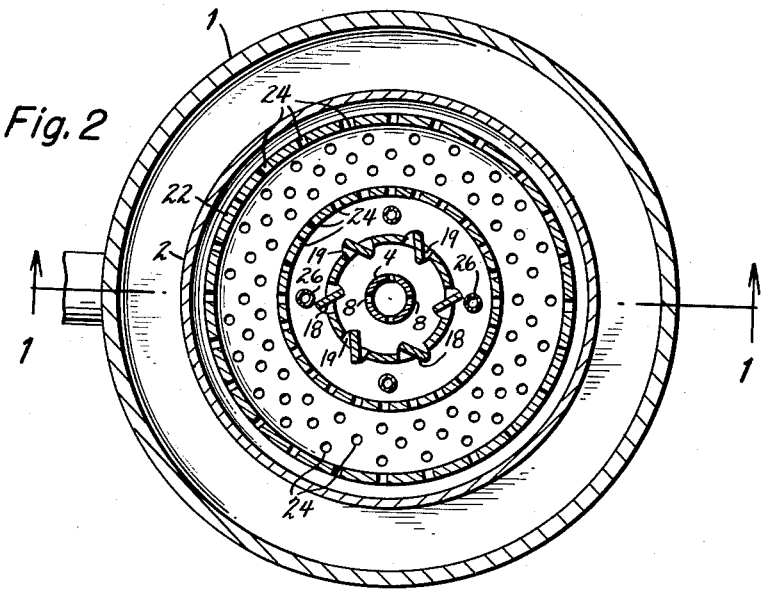
Figure 2 is a view in cross-section illustrating the motivating means to recirculate the water through the grindings taken along line 2—2 of Figure 1.
Figure 3:
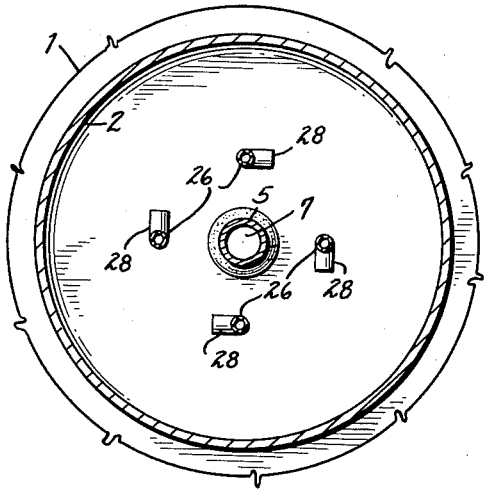
Figure 3 is a view in cross-section taken along line 3—3 of Figure 1.

A cylinder 17, open at the lower end and closed at its upper end, is formed with a centrally located hole 16 in the closed end to permit the rotating structure to be positioned on the upper end of tube 5. Cylinder 17 is connected in alignment with cylinder 10 by attaching the closed end of cylinder 17 to the lower end of cylinder 10. As illustrated in Figure 1 and perhaps more clearly in the plan section view of Figure 2, cylinder 17 is slotted and the edges of the slots twisted at numerous points around its circumference at an elevation in radial alignment with the restricted jet openings 8 in tube 5. When cylinder 17 is slotted and these sections twisted, it can be seen that in effect a series of blades 18 are formed leaving openings 19 in the cylinder wall.

The grindings are contained within an annular area 21 provided by outer cylinder 22 and inner cylinder 23 connected to an annular plate 20 which is equal in diameter to the diameter of outer cylinder 22. Annular plate 20 is formed with a circular opening equal to the inside diameter of cylinder 17 and joined to the lower end of cylinder 17 at this point, thus leaving the central portion clear. The cylinders 22 and 23 and the portion of annular plate 20 contained between the two cylinders are perforated with a large number of pinpoint holes to allow the hot water to come in contact with the grindings within the annular area 21 and permit the water to drain from the annular area into the bottom of container 2. An annular channel 25 with a cross-section in the form of a U fits between outer cylinder 22 and the inner cylinder 23 to close the upper end of annular area 21 and prevent the grindings from spilling out of the area 21 when the device is inverted in the pouring position and further, to provide a channel to distribute the water equally over the grounds when recirculated. For this latter purpose, annular channel 25 is formed with a series of small holes 29 to allow water to penetrate into the area 21.

The water collecting in the bottom of container 2 is recirculated by a series of scoops 26. The scoops 26 are supported by annular plate 20 at the openings designated by the numeral 30 and are bent at either end to accomplish the recirculating feature of the invention. At their lower ends scoops 26 are bent in a horizontal plane so that the open ends 28 face in the direction of rotation for the rotating structure and thus, the water or beverage, as the case may be, is forced into the open ends 28 when the structure is rotating. The upper ends are curved semicircularly in a vertical plane to discharge the recirculated fluid onto the distributing channel provided by U-shaped channel 25. Further, a series of openings 27 are drilled into the scoops alongside the perforated openings 24 in cylinder 23.

To complete the apparatus, a lid 31 fixes the flange 3 of container 2 in place on the upper end of container 1 to provide a steam tight seal and close the beverage maker. Lid 31 also has a pouring spout and a lifting knob 33. A heat insulating handle 34 is connected to container 1 to allow the device to be lifted and the brewed beverage to be poured.

Having thus described the construction of the apparatus of the invention, its operation is as follows. First, any desired quantity of water is placed in container 1 to bring the level up to some point, for example, that shown in Figure 1. Then container 2 is placed in position in container 1 with flange 3 engaging the upper rim of container 1 at all points around its circumference. Next, to prepare the rotating structure, the scoops 26 are swiveled from over the annular area 21 and unit quantities of grindings to correspond with the amount of water in container 1 are evenly placed around the annular area 21. The annular closure channel 25 is placed in position between cylinders 22 and 23 and scoops 26 are then swiveled back so that the discharge ends of the scoops are directly over the channel. The rotating structure is mounted on the upper end of tube 5 and lid 31 placed over the containers to effect a tight seal between the upper rim of container 1 and the flange 3 of container 2. The apparatus is then placed over a source of heat.

As the water in container 1 reaches the boiling point, steam escapes from the surface of the water and collects in the area above the water level. Since the junction of container 1 and flange 3 is tightly sealed, the steam pressure builds up until it is sufficient to force the water level downward and therefore the water up through the hollow portion 7 of tube 5. Tube 5 is solid immediately above the restricted jet openings 8 drilled in tube 5 and the steam pressure thus forces the water out through the openings 8 at a high velocity. The high velocity water strikes against blades 18 of cylinder 17 and, since the structure is supported at a single point in a low friction bearing arrangement, the structure is caused to rotate in a manner similar to a water turbine. A portion of this high velocity water passes through the openings 19 in the wall of cylinder 17 and on into annular area 21 through the small perforated openings 24. The portion of the water not passing through the openings 19 falls to the bottom of container 2, is then picked up by the rotating scoops 26 and carried upward until the holes 27 are reached. By centrifugal force, a portion of the water sprays out through the openings 27 and into the area 21 through the holes 24 while the remainder of the water is discharged onto the annular channel 25. By this method of recirculation, all of the grindings are brought in intimate contact with the hot water and the full flavor is extracted; but since the water at this point in the process is slightly below the boiling temperature, none of the bitterness in the grindings is extracted. Moreover, the length of the brewing process does not contribute to produce a bitter beverage since the motivating force is provided by steam pressure forcing the water through the jet openings 8 and the structure can rotate only so long as the water level is above the lower end of tube 5. When the level falls below this point, the brewing operation stops and the beverage is ready to be served. However, it is not necessary to remove the apparatus from the source of heat because the unit acts as a "double boiler" and keeps the beverage at the proper serving temperature until the remaining water in container 1 has completely evaporated.

It is apparent that such an apparatus as described is susceptible of numerous modifications and changes without departing in essence from the spirit of the invention. For example, the beverage can be brewed by using the steam pressure to force the water from the lower container into the upper container and by using a small electric motor mounted in lid 31 to rotate the structure and recirculate the fluid rather than by using the reaction force of the water jets to provide the rotation. Further, it is not necessary to use the scoops as the means to recirculate the beverage in the upper container but any type of recirculating means can be used for this purpose. Accordingly, it is within the scope and contemplation of this invention to include any modifications or changes obvious to one skilled in the art that can be made to the apparatus as disclosed to accomplish the objects of this invention and obtain a superior beverage from grindings or leaves.

What is claimed is:

1. Apparatus for making beverages that comprises a lower container, an upper container associated with said lower container to seal same against the atmosphere, a tube extending from adjacent the bottom of said lower container into said upper container, a perforated assembly for holding an extractable material, means mounting said perforated assembly for rotation within said upper container spaced from the bottom thereof, pumping means adapted to circulate fluid from the bottom of said upper chamber to the top of said perforated assembly responsive to rotation of said perforated assembly, and means for rotating said perforated assembly including a jet orifice defined by an opening in said tube and a series of blades on said perforated assembly surrounding said tube and in alignment with said jet orifice.

2. Apparatus as defined in claim 1 wherein said pumping means includes a tube fixed to said perforated assembly terminating adjacent the bottom of said upper container and opening in the direction of rotation of said perforated assembly.

3. Apparatus as defined in claim 1 wherein said perforated assembly includes a central bearing part and an annular basket attached to said central bearing part.

4. Apparatus for making beverages that comprises a first container sealed against the atmosphere, a second container, tube means communicating said first container with said second container, basket means for holding an extractable material rotatably mounted in said second container, means adapted to rotate said basket means responsive to transfer of fluid from said first container to said second container wherein said tube includes a jet orifice and wherein a series of blades on said perforated assembly surrounds said tube in alignment with said jet orifice, and means adapted to recirculate fluid in said second container including a tube fixed to said means to hold said extractable material and bent at its lower end to open in the direction of rotation of said means to hold said extractable material.

5. Apparatus for making beverages that comprises a lower container sealed against the atmosphere, an upper container associated with said lower container, tube means communicating said lower container with said upper container, a perforated assembly for holding an extractable material rotatably mounted in said upper container, means to rotate said perforated assembly responsive to transfer of fluid through said tube means from said lower container to said upper container, wherein said means to rotate said perforated assembly includes a jet orifice defined in said tube and a series of blades defined in said perforated assembly surrounding said tube and in alignment with said jet orifice, and tube means to recirculate fluid in said upper container through a path including said perforated assembly.

References Cited in the file of this patent

UNITED STATES PATENTS

| 630,666 | Cummings | Aug. 8, 1899 |
| 1,020,932 | Smith | Mar. 19, 1912 |
| 1,179,011 | Kittinger et al. | Apr. 11, 1916 |
| 1,300,175 | Kittinger | Apr. 8, 1919 |
| 1,471,752 | Rieckmann | Oct. 23, 1923 |
| 1,471,933 | Wertheimer | Oct. 23, 1923 |
| 1,665,423 | Skelton | Apr. 10, 1928 |
| 1,755,101 | Clark et al. | Apr. 15, 1930 |
| 1,789,334 | Englung | Jan. 20, 1931 |
| 1,809,294 | Guerin et al. | June 9, 1931 |
| 2,107,236 | Cory | Feb. 1, 1938 |
| 2,567,820 | Messer Schmiat | Sept. 11, 1951 |

FOREIGN PATENTS

| 208,788 | Great Britain | Dec. 27, 1923 |
| 247,269 | Great Britain | Feb. 10, 1926 |